United States Patent [19]
Leatherman

[11] 3,810,190
[45] May 7, 1974

[54] MAGNETIC THROUGH-FIELD APPARATUS AND PROCESS FOR PRINTING BY IMBEDDING PARTICLES IN A RECORD MEDIUM

[75] Inventor: Alfred F. Leatherman, Columbus, Ohio

[73] Assignee: William C. Heller, Jr., Milwaukee, Wis.

[22] Filed: Feb. 4, 1972

[21] Appl. No.: 223,534

Related U.S. Application Data

[63] Continuation-in-part of Ser. No. 67,810, Aug. 28, 1970, abandoned, and a continuation-in-part of Ser. No. 506,960, Nov. 9, 1965, Pat. No. 3,526,708.

[52] U.S. Cl. .................... 346/74 MP, 101/DIG. 13
[51] Int. Cl. .................... G01d 15/12
[58] Field of Search ......... 346/74 ES, 74 MP, 74 M, 346/74 TP; 101/DIG. 13

[56] References Cited

UNITED STATES PATENTS

| | | | |
|---|---|---|---|
| 3,526,708 | 9/1970 | Leatherman | 346/74 MP |
| 3,161,544 | 12/1964 | Berry | 346/74 MP |
| 3,437,074 | 4/1969 | Hagopian | 346/74 MP |
| 3,526,191 | 9/1970 | Silverberg | 101/DIG. 13 |
| 3,017,234 | 1/1962 | Trimble | 346/74 MP |
| 3,279,367 | 10/1966 | Brown | 346/74 MP |

*Primary Examiner*—James W. Moffitt
*Assistant Examiner*—Jay P. Lucas
*Attorney, Agent, or Firm*—Andrus, Sceales, Starke & Sawall

[57] ABSTRACT

A printing method and apparatus employs a high frequency magnetic through-field of high strength for effecting lodging of magnetic particles on a record medium. The control or shape determining field pole is located on the same side of the record medium as the toner.

26 Claims, 10 Drawing Figures

MAGNETIC THROUGH-FIELD APPARATUS AND PROCESS FOR PRINTING BY IMBEDDING PARTICLES IN A RECORD MEDIUM

This application is filed as a continuation-in-part of copending Leatherman application Ser. No. 67,810 filed Aug. 28, 1970, and now abandoned entitled APPARATUS AND PROCESS FOR PRINTING and of application Ser. No. 506,960, filed Nov. 9, 1965, entitled MAGNETIC THROUGH-FIELD APPARATUS AND PROCESS FOR PRINTING BY IMBEDDING PARTICLES IN A RECORD MEDIUM, and granted as U.S. Pat. No. 3,526,708 on Sept. 1, 1970. The entire disclosures of said Leatherman application and patent are specifically incorporated herein by this reference.

BACKGROUND OF THE INVENTION

This invention relates to apparatuses and processes for magnetic printing, impregnation, coating, duplication and so forth.

Technical progress of recent years has seen the development of many printing and reproduction techniques that have considerably broadened the original work of Gutenberg. Methods finding modern favor offer processes that are dry, fast, and economical.

The formation of marks and written characters has received considerable attention in recent decades and some processes have been developed to relatively advanced points. Among the handicaps to any printing or impregnating process is that if the process is wet, a drying stage must be incorporated. If dry, a means must be found for melting by heat, hammering, softening by vapors, or otherwise causing the powders to become fixed to the paper, plastic, etc. These treatments normally must be carried out after forming the mark, and therefore special care is required not to smudge or disturb the pattern. This requirement can call for appreciable consumed time and/or space in the process. Disadvantages of time and cost are also involved if it is necessary to apply heat to the otherwise finished material to accomplish fixing.

It is apparent that wet or dry printing or impregnating processes of the past have met with considerable disadvantage. One process that has been used for certain printing or coating tasks to overcome some of the disadvantages of the prior art is the electrostatic process.

Several problems arise in the area of electrostatic processes. Large black areas are not always amenable to reproduction capable of distinguishing these black areas from the background. The electrical insulation characteristics of paper and plastics permits such things as latent images in electrostatics but also cause distortion of the electric field to produce distorted copy. Handling of the materials, or operation of the machinery, also can produce electric charges by "friction" at undesired places possibly resulting in background problems, and stray electric fields can cause similar difficulties. Atmospheric humidity may have an adverse effect on the operation of electrostatic methods. Some electrostatic methods require sensitive image plates and other fragile devices that can become scratched and worn with direct adverse effects on results. In addition, electrostatic equipment requires higher voltages than that available from ordinary power distribution lines.

SUMMARY OF THE INVENTION

The present invention is specifically concerned with printing techniques for providing more sharply defined marks.

For this purpose, the invention contemplates an arrangement wherein the shape defining field pole is located adjacent the same surface of the record medium as are the magnetic toner particles. The proximity of the shape defining pole to the deposit surface allows the source region of the field to be of desired shape and not subject to fringing at the deposit surface. Improved sharpness results both for system parameters that provide indelible marks and for system parameters that do not provide indelible marks.

In particular, the use of selected magnetic particles, the use of a field pole of magnetically soft material and the use of an alternating polarity through-field having a fundamental frequency of about 1,000 cycles per second or more have been shown to improve the sharpness of the marks produced. These factors, in conjunction with a field strength of several times that required for simple transfer deposit provide indelible marks that are sharply defined. Magnetically hard particles, in some applications, offer advantages both as to sharpness and as to indelible features.

In addition, the use of a field concentrator element having an edge on the opposite side from the shape controlling field pole and aligned therewith, further minimizes fringing of the shaped field.

Other features and advantages of the invention will be apparent from the following description and claims and are illustrated in the accompanying drawings which show structure embodying preferred features of the present invention and the principles thereof, and what is now considered to be the best mode in which to apply these principles.

DESCRIPTION OF THE DRAWINGS

In the accompanying drawings forming a part of the specification, and in which like numerals are employed to designate like parts throughout the same.

DETAILED DESCRIPTION

Figure 1:
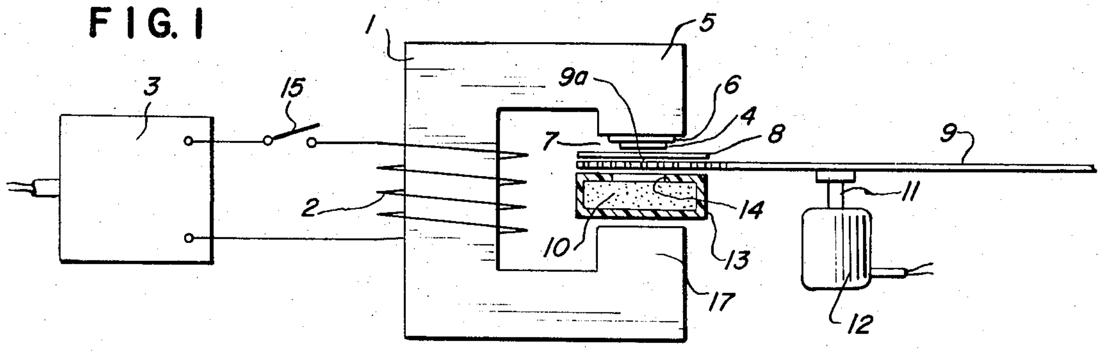
FIG. 1 is a schematic diagram partially in cross-section showing an apparatus for magnetic printing and impregnating and corresponds to FIG. 1 of Leatherman U.S. Pat. No. 3,526,708.

To facilitate understanding of the method and apparatus for printing disclosed herein, FIG. 1 of the abovementioned patent, without change, appears as FIG. 1 herein.

As stated in said patent and with reference to FIG. 1, a laminated iron magnetic core structure 1 is partially wound with a magnetizing winding 2 connected to a source of electric current 3. A "magnetically soft" (unretentive) alloy shaped in the form of a flat cut-out arabic numeral *a*, designated 4 in the drawing, is mounted on the underside of pole piece 5 so as to be within the area defined by air gap 7. In air gap 7 of core 1, adjacent the magnetic numeral 4, there is disposed a paper, fabric or other non-magnetic (paramagnetic or diamagnetic) particle-receiving material 8. Positioned also in air gap 7 is container 13 having opening 14 and containing magnetic particles. Container 13 serves as a reservoir of the supply system for introducing magnetic particles into air gap 7.

Upon closing switch 15, the current in winding 2 establishes a magnetic field across air gap 7. The magnetic field thus formed interacts with the magnetic particles to produce field forces for driving some of the particles from container 13 so as to impel such particles into contact with the lower surface of particle receiving material 8. The presence of magnetic numeral 4 within the space defined by air gap 7 causes a larger number of magnetic particles to be deposited against the particle receiving material 8 at those areas directly in line with and corresponding to the shape of the magnetic numeral 4 than are deposited at other portions of the particle-receiving material 8, the field forces being greater at those areas than elsewhere on the particle-receiving material 8. Upon energizing core 1, and examining particle-receiving material 8, it is found, when a proper apparatus and process is used, that a printed character is formed on material 8 corresponding to the shape of magnetic numeral 4.

In FIG. 1, the release of particles 10 from supply chamber 13 is controlled by means of a shutter 9 positioned adjacent to particle-receiving material 8 and air gap 7 of core 1. Shutter 9 contains one or more openings 9*a* to permit passage of the magnetic particles or toner 10 to the surface of particle-receiving material 8. As shown, shutter 9 is mounted on a shaft 11 for rotation by motor 12.

The particle supply and distribution system may be of many different forms known to those familiar with this art. A number of such systems are disclosed in the aforesaid U.S. Pat. No. 3,526,708 and are incorporated herein by this reference.

Figures 2, 3, 4:
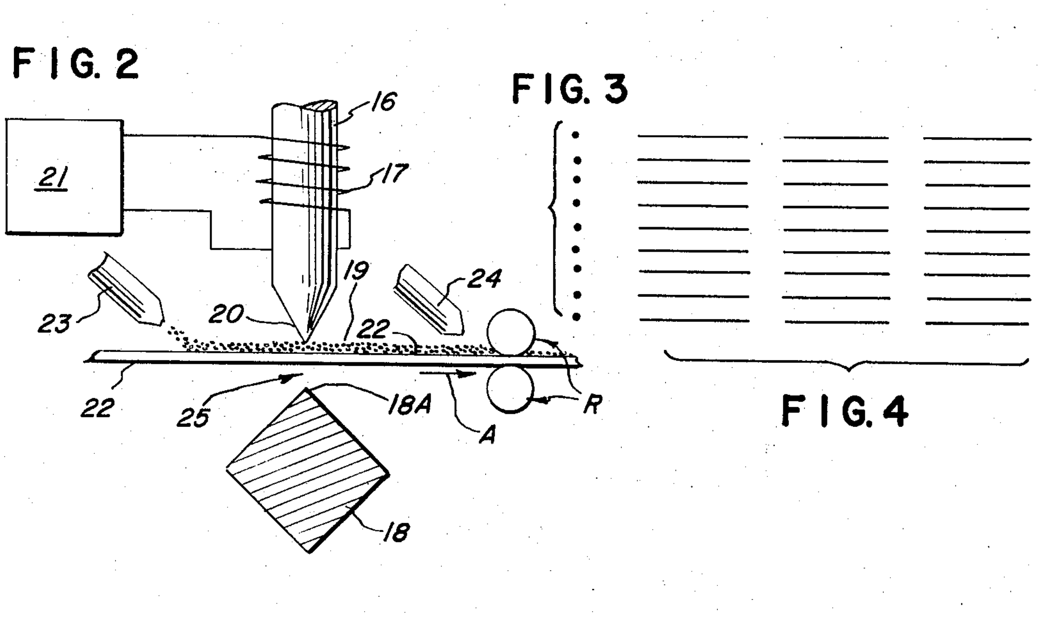
FIG. 2 is a schematic side elevation view showing an arrangement for providing magnetic printing characterized by more sharply defined marks.
FIG. 3 is a magnified view of the marks produced by an array of nine cores energized simultaneously while the record medium is stationary.
FIG. 4 is a magnified view of the band with broken regions formed by providing relative scanning movement between an array of nine cores and the record medium while simultaneously energizing or deenergizing the cores.

The improvement to which the present invention relates is illustrated in FIG. 2 wherein a wire or needle-shaped magnetic core 16 of magnetically soft material is shown partially wound with a magnetizing winding or coil 17 which can be electrically energized on and off by a power supply and controlling device 21 to govern the magnetized state of core 16 which is made of an unretentive, magnetically "soft" material, such as 50—50 nickel-iron alloy.

A record medium 22, such as a piece of ordinary copy paper, is shown in position for imprinting between core 16 and field plate 18 serving as a magnetic flux concentrator. The concentrator 18 illustrated in FIG. 2 comprises an elongated bar of iron of rectangular cross-section positioned with one edge 18*a* near the record medium 22 and aligned with the point of core 16. Also present on the same side of the record medium 22 as the control core 16 are magnetic "toner" particles 19 which are illustrated in FIG. 2 as simply resting loosely on the record medium 22, there being means known in the art for applying and removing excess toner which can be employed to apply and collect the same. The toner applying means are shown at 23 in FIG. 2 and the toner removing means are shown at 24.

In the embodiment illustrated herein for purposes of disclosure, the toner particles are of magnetically "hard" material, such as barium ferrite, but in other applications of this invention it is contemplated that other suitable particles may be employed. Core 16 and concentrator 18 comprise field pole means which, as is explained in detail in the aforesaid patent, function to determine the shape of a magnetic through-field that interacts with the toner particles to produce field forces acting to drive the particles towards the medium to deposit the particles in a pattern corresponding to the shape of the through-field determined by the core 16. The shape of core 16 determines the effective shape of the through-field and, hence, may be referred to as the field-shaping pole or control core, or as the source region of the shaped through-field.

In the particular arrangement disclosed herein a small air space 25, typically of 20 to 40 mils, but which can in some cases be as small as about 10 mils or larger than 40 mils, is provided between the edge 18*a* of concentrator 18 and the bottom surface of the record medium 22. Unless such a clearance space is provided, it is found (when using a concentrator of the shape illustrated in FIG. 2) that the image of the edge 18*a* of the concentrator 18 tends to show up in the toner pattern. The magnetic flux of the core 16 would tend to fringe in a straight line pattern when the sharp edge of the concentrator is too close. A rounded corner or other concentrator shape may minimize the image effect. The clearance space between the upper surface of the record medium 22 and the point of the core 16 is preferably minimal, for example, the point of the core 16 may be allowed to drag through the loose layer of toner powder 19 whenever relative scanning motion between the record medium 22 and core takes place. Paper drive mechanism, such as rollers R, are shown in FIG. 2 to drive the paper in the direction of the arrow A for providing such relative scanning motion. To insure this relation, a flexible supporting medium (not shown) may be placed under the record medium 22 to supply an upward spring tension sufficient to push the record medium lightly against the core 16.

In the actual development of the present invention, after assuring that at least a small quantity of toner powder was present at the immediate vicinity of the point of the core 16, the winding 17 was energized with an alternating electric current of generally sine-wave form at a frequency of 5 KHz. Successful operation, for producing indelible marks, was obtained where the current and number of turns are such as to provide about 150 ampere turns total magnetizing force at the winding. Lesser magnetizing potential can also produce indelible marks but not as securely. The energizing current for the winding 17 need be applied only briefly, such as for 0.1 second. In the embodiment illustrated herein for purposes of disclosure, upon examination of the record media following energization, a small dot of toner can be seen at the region of the record medium 22 where the point of the core 16 had been located. Where ordinary typewriter paper, computer printout paper, or notepad papers are used for the record media for example, and where finely divided barium ferrite powder, or fine black powder oxide ($Fe_3O_4$) having particles in the sub-micron size range is used for the toner, for example, the resultant dot mark will be indelible upon attempting to erase it by means of a pencil eraser. It is believed that indelible printing can also be obtained with other magnetic materials such as $CrO_2$ or others.

Typically, the practical frequency range extends from about 1 KHz to about 10 KHz but frequencies above and below this range can also be used. For example, frequencies of as high as 500 KHz should be considered. It is not known if waveforms other than sine wave will produce indelible marks, but the invention contemplates the use of other wave shapes.

It has also been established both for the FIG. 1 embodiment and the FIG. 2 embodiment that inproved sharpness of the marks produced is achieved, where the arrangement employs selected magnetic particles, a field pole of magnetically soft material, and an alternating polarity through-field having a fundamental frequency of about 1,000 cycles per second or higher. The provision of the field concentrator further enhances the sharpness of the marks.

Figure 6:
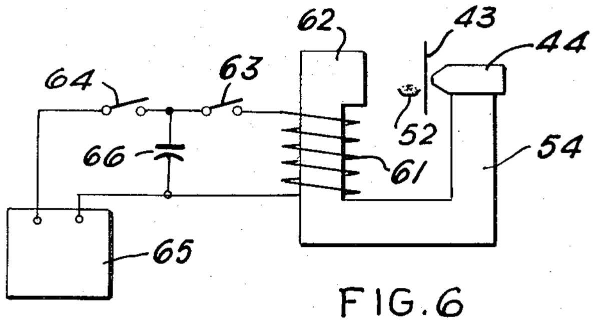
FIG. 6 is a vertical diagrammatic view of magnetic printing apparatus in which the magnetic particles are contained in a holder in an air gap and a capacitor is used to provide a damped oscillatory discharge current flow in the coil of the magnet.

In the embodiment of FIG. 6, a substantially larger air gap is shown than in FIGS. 1 and 2. Referring to FIG. 6, paper 43 (edge view) upon which printed characters are to be made is located close to or in contact with a magnetic type face 44. Magnetic powder 51 is shown in a reservoir or holder 52 near the type face 44 but separated from it by paper 43. Type face 44 is arranged to serve as part of magnetic core 62 which is provided with winding 61 to control energization thereof.

The embodiment of FIG. 6 employs capacitor discharge techniques. An oscillatory transient current flow is realized in winding 61 (and consequent oscillatory magnetic flux in core 62) by first opening switching device 63 and then closing switching device 64 so as to permit power supply 65 to deliver electrical energy to storage capacitor 66. A D-C power supply is used, but the type of electrical power supply is not restricted. When electrical energy of the desired level corresponding to the design of coil 61 has been stored in capacitor 66, switch 64 is opened and switch 63 is closed to cause the capacitor to deliver its energy to coil 61. As well known in the electrical art, easily realized design conditions then result in a damped oscillatory discharge current flow in the circuit of capacitor 66 and coil 61. It is apparent that the apparatus can be modified to deliver greater voltage to the capacitor and that electronic or other high speed switching can be used to decrease the time. Also, synchronizing means can be used to synchronize the magnetic pulses with the feed of the paper past type bar 44.

Figure 6A:
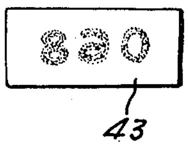
FIG. 6A is a top plan view of a magnetically printed piece of paper using the apparatus of FIG. 6.

In the apparatus shown in FIG. 6, three magnetic type faces 44 having the numerals 8, 6, and 0 were mounted on pole 54. By charging capacitor 66 to about 300 volts, the resultant oscillation produced the printing on paper 43 as seen in FIG. 6A.

Figure 7:
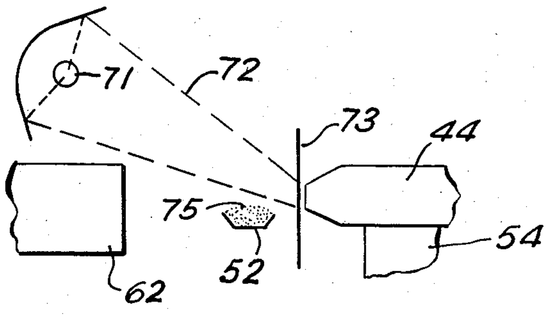
FIG. 7 is a schematic side view of a portion of a magnetic printing device using a radiant heat source.

In FIG. 7 is shown a modification of the apparatus shown in FIG. 6. A radiant heat source 71 is mounted adjacent the core and directs its beam 72 toward type face 44. In place of paper 43, a thermoplastic sheet or waxed paper 73 is used. Radiant heat source 71 serves to soften thermoplastic sheet or waxed paper 73 to cause magnetic powder to become imbedded therein upon striking the same. In place of radiant heater 71, other types of heat sources could be used to soften material 73 to be marked upon including the use of ovens, directed flames, etc. Further, heating to a temperature sufficient to soften the surface of 73 need not be done with material 73 in place as shown in FIG. 7 but could be done prior to the printing step, for example, as part of a moving process.

The magnetic type faces 4 and 44 of FIGS. 1, 6 and 7 need not be used in the larger magnetic circuit as shown but can be individually supplied with magnetizing windings if desired without the magnetic flux return structure shown. Also, as shown above, it is not necessary to use a complete stamping die or typeface for each separate character. Moreover, the seven-segment form of character which is employed in digital readouts can be used with appropriate switching to magnetize seven separate core segments (an eighth segment is used for a decimal point).

The methods previously described show portions of apparatus located on both sides of the material to be printed upon. However, in the method of the present invention the printing operation can be accomplished from one side of the material. For example, printed information can be applied to closed packages, solid objects, containers with small necks, etc. Preferably, the apparatus is arranged to avoid contact between the magnetic character forming face and the magnetic particles to avoid the necessity for cleaning the magnet face and to insure the application of more uniform pressure to the body being printed.

Referring first to FIGS. 1, 6 and 7 and the accompanying description above, a process is shown by which a permanent mark is made on a piece of paper, for example, instantly in a dry process without heat. Field sources or type-face units 44 of FIGS. 6 and 7 can be replaced by a plurality of pointed probes the magnetization of which can be individually controlled electrically at will, so as to copy a given original pattern. The basic arrangement of the equipment for such process consists of the elements illustrated in FIG. 8, in which an original presentation of information consisting in this case of a letter W written on the underside, as shown, of a piece of paper 201, as shown, is arranged so that a linear array 202 of photoelectrically sensitive cells 203 will respond to the information along an optically observed line 204 on sheet 201 in the field of view of lens 205. The photocells are located in the focal plane of lens 205. Thus, at any time when suitable illumination is present as known in the art, the photocells 203 are excited in a pattern corresponding to the light and dark characteristics of original copy 201 along a typical line 204. The definition and resolution of this excitation can be improved when closely-spaced photocells are used. Upon moving the array 202 and lens 205, as shown by the arrows, the optically observed line 204 scans from one end to the other of the sheet 201, and a complete time-dependent characterization of the information on sheet 201 is available via the outputs of photocell array 202. A complete mosaic of photocells can be used instead of line-wise scanning although such may be more complex than the line-wise method. Also, the line arrangement permits staggering of photocells to achieve better resolution as will be described later.

The outputs of all photocells 203 of cell array 202 are continuously fed through amplifier system 206 in an individual manner to provide corresponding energizations of the individual electromagnetic writing tips 210 located at the reproducing region of the apparatus. Said tips are arranged in a line array 211 corresponding to the original photocell array so that when a given individual photocell 203 is optically excited, an individual magnetic tip 210 corresponding in spatial relationship, is caused to be energized at a corresponding position on sheet 212 upon which the reproduced copy is to be created. Sheet 212 can be held in place near its corners or in a suitable frame. By means of the basic procedures and principles described herein by causing magnetic array 211 to scan in synchronism with photocell array 202, sheet 212 is caused to receive typically from a cloud 215 of magnetic or magnetizable particles, above sheet 212, a directly printed portrayal of the original. To accomplish said reproduction, amplifier unit 206 may also, desirably, besides providing suitable power amplification of the original information, produce oscillatory or alternating energization of magnetic elements 210 in keeping with the advantages described for the procedures of FIGS. 1, 6 and 7. It is to be understood that a source of light is positioned near or adjacent sheet 201 so that light patterns (direct or reflected) are passed through lens 205 in accordance with the pattern on sheet 201 to the photocells. Suitable shielding means can be employed to be certain that only the desired light rays from sheet 201 are being used and to avoid extraneous light rays. The light source for activation of the photo sensitive devices can be any form of radiant energy such as sunlight, tengsten bulb, fluorescent, infrared, ultraviolet, etc.

Figure 8:
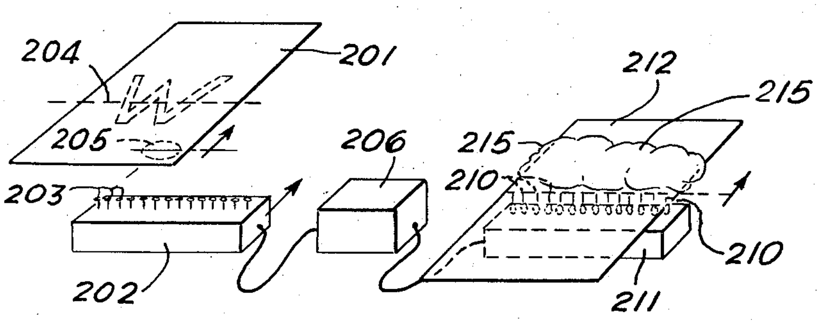
FIG. 8 is a schematic diagram in perspective of an arrangement of apparatus in which an array of photocells scans the copy and transmits inpulses to an array of magnets which reproduces the copy using magnetic powder.

Several alternative arrangements of the photocell array and the magnetizing array of FIG. 8 can be obtained by use of flexible interconnecting wiring between the two. These arrangements permit the photocell array to scan vertically while the magnetic array scans horizontally, and vice versa. The cloud of magnetic particles can be located below sheet 212 and sprayed upward onto it in the reverse manner of arrangement to that shown in FIG. 8, for example, with magnetic array 211 positioned above sheet 212. Also, the scanning of either unit need not take place in a straight path but can be curved as on a drum, fan-shaped, or can take other desired paths, and the component photocells or magnetizing tips of the arrays need not be mounted in a straight line. A mosaic or magnetic writing tips can be used.

The apparatus of FIG. 8 as well as that described herein shown that dot-wise, lined or continuous patterns can be magnetically reproduced on a member to be printed. However, the method shown does not need a recording member, it includes all the necessary steps to produce a general copy of an arbitrary original and it permits this to be done without special paper or heat when desired.

Figure 9:
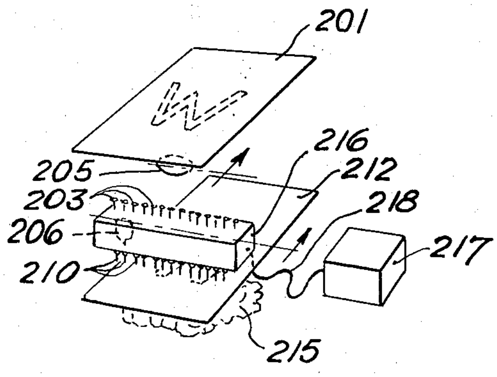
FIG. 9 is a view similar to FIG. 8 in which the photocell copy array is mounted adjacent the magnetic core reproducing array in the same apparatus.

FIG. 9 shows that the amount of flexible wiring could be reduced and a saving of space realized by mounting both the photocell and magnetizing arrays on the same scanning carriage. The amplifiers can also be contained in the scanning carriage with only power-supply connections of minor complexity connecting to other facilities. As shown in FIG. 9, paper 201 is being scanned by motion of scanning carriage 216 and lens 205 in the direction shown by the arrows. The scanning carriage has integrally mounted to it or within it the photocells 203 in an array, the amplifiers 206 and the magnetizing elements 210 in an array. Electric power in suitable form is connected to the scanning carriage from power supply 21 by means of flexible leads 218 in the figure shown. Other possible means for transmission of such power include slip-ring tracks or wheel electrodes, etc. or batteries can be used on the carriage in a portable-type design. Cloud or other particle supply 215 in this case is beneath the sheet 212 upon which the reproduction is being made. Sheet 212 can be supported in position by suitable mechanical holders at its corners or in a frame.

It is to be noted that in both the schemes of FIG. 8 and 9 that the reproduced copy is imprinted in final form by a one step process with no delay for receipt of copies after exposure. In some cases, more desirable results may be obtained when prior or subsequent steps are included into these processes. Such combinations that can separate some of the single or combination steps or apparatus of this invention into separate steps, or parts thereof, are considered to be implied in the present disclosure.

One difference between the embodiments of FIGS. 1 and 2 resides in the fact that the toner in FIG. 2 is on the same side of the record media as is the magnetic pole 16 and its driving coil 17 whereas the reverse is true in the embodiment of FIG. 1. Aside from enabling a simplified equipment arrangement, due to the ability to locate all active operating components on the same side of the record medium, it has been found experimentally, as stated hereinabove, that the arrangement as illustrated in FIG. 2 also produces a distinct improvement in the sharpness and resolution of the imprint on the record medium. While in both cases the toner is driven toward the record media by a magnetic through-field, the improved results provided by the embodiment of FIG. 2 are a consequence in part of there being less fringing of the magnetic through-field than is the case in embodiments of the type shown in FIG. 1 in which the field source is not so close to the deposit location of the toner. The combination of the use of magnetically soft materials for the field poles, the use of magnetically hard materials for the toner, and the production of an alternating polarity through-field having a fundamental frequency of greater than about 1,000 cycles per second, as previously indicated, is also important in achieving improved sharpness.

The single pole 16 shown in FIG. 2 comprises one pole of a linear 9 pole array which is aligned with the edge 18*a* of the concentrator 18 in the fashion illustrated in FIG. 41 of the aforesaid Leatherman patent.

For example, the nine poles may be located within 0.080 inch distance overall. Each such pole 16 is capable of making a point or dot where there is no relative scanning movement between the record medium and the poles.

The feed roll mechanism as shown at 24 in the embodiment of FIG. 2 provides relative scanning movement allowing each pole to produce a line or trace in accordance with the energization thereof during scanning movement.

If all nine cores are energized simultaneously and the record medium is held still, the nine closely spaced dots shown in the magnified view of FIG. 3 appear like a straight vertical line. If scanning movement is provided while all nine poles are simultaneously energized and deenergized, the interrupted sets of nine separate lines shown in the magnified view of FIG. 4 appear as a black band with broken areas in it.

Figure 5:
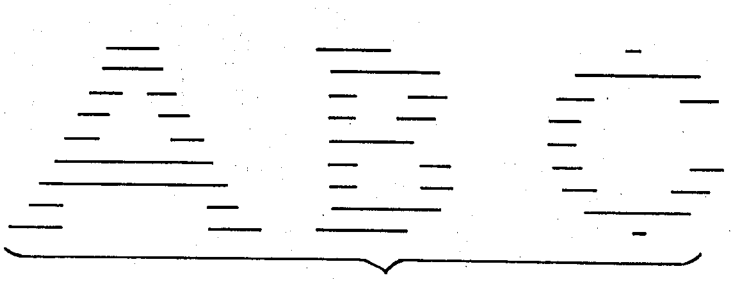
FIG. 5 schematically represents alphanumeric characters printed by the nine core array by properly controlling the energizing sequence thereof by relative scanning motion.

With this background, it will be apparent that by proper sequencing of the energization times for each of the nine poles, a series of alphanumeric characters can be printed out as shown at A, B, and C in the magnified view of FIG. 5. In practice, the spaces between the trace lines are difficult or impossible to see, resulting in legible recorded data. It should be noted that whereas FIG. 5 depicts horizontal scanning, it is also contemplated that vertical scanning may be employed for pattern generation.

It is not necessary to limit the disclosure to only nine cores, of course, and scanning lengthwise along a printed sentence is only one possible application of the invention. The fastest print action probably would be obtained with a row of points, or several interplaced rows of points, extending across the full width of a record medium as shown in FIGS. 30 to 39, 41 and 42 of the aforesaid Leatherman patent. Print actuation would then be in parallel fashion with a whole line of characters being printed at once.

Instead of using high magnetic field strengths described above with reference to FIG. 2, a lesser value can be used, as obtained by reduced current in the winding 17, or as a result of not using the concentrator 18, a point is reached at which distinct, useful marks may be still obtained but which are not indelible as produced. There are numerous conventional means that can be adopted to convert such marks to the indelible state (i.e., "fix" them) for normal use. Thus, for example, a wax component of the toner may be melted or the mark can be exposed to solvent vapor in order to achieve permanent marking. Where the record medium is of a non-porous material, such as polyethylene film, separate fixing is in any event necessary and desirable in order to obtain a permanent mark. The improved sharpness and resolution techniques of this invention are also applicable to the non-permanent applications described herein.

Thus, while preferred constructional features of the invention are embodied in the structure illustrated herein, it is to be understood that changes and variations may be made by those skilled in the art without departing from the spirit and scope of the appended claims.

What is claimed is:

1. A method for printing or marking on one surface of a member of substantially non-magnetic material, said method comprising freely distributing dry magnetic particles at regions in the vicinity of said surface and forming an alternating polarity magnetic through-field that has a fundamental frequency of greater than about 1,000 cycles per second, that has a source region of predetermined shape adjacent the same side of said member as said one surface and that passes through said member, said forming step including positioning an edged field plate adjacent the surface opposite to said source region and said particles to concentrate the through-field against fringing in said member, said through-field interacting with said particles to produce field forces acting to move the particles away from the source regions and thereby deposit the particles in a pattern corresponding to the shape of the through-field.

2. An apparatus for marking, impregnating, printing or coating a surface of a member of substantially non-magnetic material and comprising means for freely distributing finely divided dry magnetic particles of magnetically hard material in the vicinity of one surface of said member and field pole means for forming an alternating polarity magnetic through-field that has a fundamental frequency of greater than about 1,000 cycles per second, that has a source region of predetermined shape adjacent one side of said member and that passes through said member, said field pole means including an electromagnet core of magnetically soft material having a pole tip adjacent to the same surface of said member as said particles and an energizing coil encircling said core to apply an alternating current having a fundamental frequency of greater than about 1,000 cycles per second, said through-field interacting with said particles to produce field forces acting to directly deposit the particles on said member in a pattern corresponding to the shape of the through-field.

3. Apparatus as defined in claim 2 and wherein said field pole means includes an edged field plate adjacent the surface of said member opposite to said source region to concentrate the through-field against fringing in said member.

4. A method for marking, impregnating, printing or coating a surface of a member of substantially non-magnetic material, said method comprising freely distributing dry magnetic particles at regions in the vicinity of said surface and producing a damped oscillatory discharge current flow through a magnetizing winding to form a magnetic through-field that passes through said member and has a source region of predetermined shape adjacent said member, said through-field having a damped oscillatory characteristic and interacting with said particles to produce field forces acting to deposit the particles on said one surface in a pattern having the shape and resolution characteristics of the source region.

5. A method for marking, impregnating, printing or coating a heat softenable surface of a member of substantially non-magnetic material, said method comprising freely distributing dry magnetic particles at regions in the vicinity of said surface, heating the heat softenable surface sufficiently to soften the same and forming a magnetic throughfield interacting with said particles to produce field forces acting to imbed the particles on said one surface while in a softened state and in a pattern having the shape and resolution characteristics of the source region.

6. A method for marking, impregnating, printing or coating a surface of a member of substantially non-magnetic material, said method comprising freely distributing dry magnetic particles at regions in the vicinity of said surface and forming a magnetic through-field that passes through said member and has a source region of predetermined shape adjacent said member by applying systematic electrical signals to form individually originating through-fields in an organized pattern collectively defining said shape, said individually originating through-fields interacting with said particles to produce field forces acting to deposit the particles on said one surface in a pattern having the shape and resolution characteristics of the individually originating throughfields.

7. A method in accordance with claim 6 wherein each of the individually originating through-fields is of alternating polarity and has a fundamental frequency greater than about 1,000 cycles per second.

8. A method for marking, impregnating, printing or coating a surface of a member of substantially non-magnetic material, said method comprising freely distributing dry magnetic particles of pulverized magnetically hard material at regions in the vicinity of said surface and forming a magnetic through-field that is of alternating polarity having a fundamental frequency greater than about 1,000 cycles per second, and that has a source located to the same side of said member as said particles and of about 150 ampere turns strength and of predetermined shape adjacent said surface, said through-field interacting with said particles to produce field forces acting to form and deposit the particles on said one surface in a pattern having the shape and resolution characteristics of the source region.

9. A method in accordance with claim 8 wherein said member is paper.

10. A method for marking, impregnating, printing or coating a surface of a member of substantially non-magnetic material, said method comprising freely distributing dry magnetic particles at regions in the vicinity of said surface and forming a magnetic through-field that passes through said member and has a field source region to the same side of said member as said particles and being of predetermined shape adjacent said surface, said through-field interacting with said particles to produce field forces acting to deposit the particles on said one surface in a pattern having the shape and resolution characteristics of the source region.

11. A method in accordance with claim 10 and including positioning an edged field plate adjacent the other surface of said member and in opposing relation to the source region to concentrate the through-field against fringing in said member.

12. A method in accordance with claim 11 wherein a clearance between said other surface and said edged field plate is about 10 mils or greater.

13. A method in accordance with claim 10 wherein said member is paper, said particles are of a pulverized magnetically hard material and the through-field is of alternating polarity and has a fundamental frequency greater than about 1,000 cycles per second and a field strength several times the value required to effect simple transfer deposit of the particles to drive said particles against said one surface and indelibly lodge said particles in said paper.

14. A method in accordance with claim 10 wherein said member is paper.

15. A method in accordance with claim 10 wherein the through-field is of alternating polarity and has a fundamental frequency greater than about 1,000 cycles per second.

16. A method in accordance with claim 10 wherein said source region of the through-field has a source strength of about 150 ampere-turns.

17. A method in accordance with claim 10 wherein the particles are of a pulverized magnetically hard material and the through-field is of alternating polarity and has a fundamental frequency greater than about 1,000 cycles per second.

18. An apparatus for marking, impregnating, printing or coating a surface of a member of substantially non-magnetic material and comprising means for freely distributing finely divided dry pulverized magnetic particles in the vicinity of one surface of said member and field pole means for forming a magnetic through-field that passes through said member, said field pole means including field source means of predetermined shape located adjacent said one surface to determine a source region for said through-field that is of corresponding shape, said magnetic particles being located between the field source means and the said one surface with the field forces acting to deposit the particles on said one surface in a pattern having the shape and resolution characteristics of the source region.

19. An apparatus as defined in claim 18 wherein said field pole means provides a high frequency alternating polarity magnetic through-field having a fundamental frequency greater than about 1,000 cycles per second.

20. An apparatus as defined in claim 18 wherein said field pole means has a field concentrator edge positioned adjacent the other surface of said member in opposing relation to said source region to concentrate the through-field against fringing in said member.

21. An apparatus as defined in claim 20 wherein said field pole means includes an electromagnet core of magnetically soft material having a pole tip adjacent said one surface to define said source region and an energizing coil encircling said core to apply an alternating current having a fundamental frequency of greater than about 1,000 cycles per second for producing a corresponding alternating polarity magnetic through-field.

22. An apparatus as defined in claim 21 wherein said coil applies a magnetizing force to said core of about 150 ampere-turns.

23. An apparatus for marking, impregnating, printing or coating a porous surface of a substantially non-magnetic member and comprising means for freely distributing finely divided pulverized magnetic particles in the vicinity of one surface of said member and field pole means for forming a high frequency alternating polarity magnetic through-field that passes through said member, said field pole means including field source means of predetermined shape located to the same side of the member as said particles and adjacent said one surface to determine a source region for said through-field that is of corresponding shape and that is of a strength several times the strength required to effect simple transfer deposit of the particles to produce field forces on the distributed particles and drive said particles against said one surface to indelibly lodge in the member in a pattern having the shape and resolution characteristics of the source region.

24. An apparatus as defined in claim 23 and wherein said field pole means provides a through-field having a fundamental frequency greater than about 1,000 cycles per second.

25. An apparatus as defined in claim 23 and wherein said field pole means has a field concentrator edge positioned adjacent the other surface of said member in opposing relation to said source region to concentrate the through-field against fringing in said member.

26. An apparatus as defined in claim 23 and wherein said field pole means includes an electromagnet core of magnetically soft material having a pole tip adjacent said one surface to define said source region and an energizing coil encircling said core to apply an alternating current having a fundamental frequency of greater than about 1,000 cycles per second for producing a corresponding alternating polarity magnetic through-field.

* * * * *